(12) United States Patent
Davies

(10) Patent No.: US 12,534,189 B2
(45) Date of Patent: Jan. 27, 2026

(54) SHARED ACTUATOR FOR LEADING EDGE HIGH LIFT ARCHITECTURE

(71) Applicant: Goodrich Actuation Systems Limited, Solihull (GB)

(72) Inventor: Stephen Harlow Davies, Shrewsbury (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 17/720,552

(22) Filed: Apr. 14, 2022

(65) Prior Publication Data

US 2022/0340263 A1 Oct. 27, 2022

(30) Foreign Application Priority Data

Apr. 21, 2021 (EP) .................................... 21275045

(51) Int. Cl.
*B64C 13/34* (2006.01)
(52) U.S. Cl.
CPC .................... *B64C 13/34* (2013.01)
(58) Field of Classification Search
CPC ................. B64C 13/34; B64C 13/00
See application file for complete search history.

(56) References Cited

U.S. PATENT DOCUMENTS

| | | | |
|---|---|---|---|
| 4,399,970 A | 8/1983 | Evans | |
| 4,779,822 A | 10/1988 | Burandt et al. | |
| 4,838,503 A | 6/1989 | Williams | |
| 4,979,700 A * | 12/1990 | Tiedeman | B64C 13/34 244/99.2 |
| 5,722,616 A | 3/1998 | Durand | |
| 10,538,310 B2 | 1/2020 | Polcuch | |
| 10,875,630 B2 | 12/2020 | McClements et al. | |
| 2019/0226530 A1* | 7/2019 | Meyer | F16D 3/06 |

FOREIGN PATENT DOCUMENTS

| | | |
|---|---|---|
| EP | 2336023 A2 | 6/2011 |
| EP | 2336023 A3 | 7/2014 |

OTHER PUBLICATIONS

European Search Report for Application No. 21275045.9, mailed Oct. 15, 2021, 7 pages.

* cited by examiner

*Primary Examiner* — Joshua D Huson
*Assistant Examiner* — Shanna Danielle Glover
(74) *Attorney, Agent, or Firm* — CANTOR COLBURN LLP

(57) ABSTRACT

A rotary geared actuator (RGA) for actuating movement of a first movable surface and a second movable surface. The RGA include an input shaft configured to receive torque in use, and an output shaft comprising means configured to communicate with and move both said first surface and said second surface in use. The actuator may be used in a leading edge high lift architecture for an aircraft wing, or may be used in other applications.

2 Claims, 2 Drawing Sheets

SHARED ACTUATOR FOR LEADING EDGE HIGH LIFT ARCHITECTURE

CROSS REFERENCE TO RELATED APPLICATIONS

This application claims priority to European Patent Application No. 21275045.9 filed Apr. 21, 2021, the entire contents of which is incorporated herein by reference.

FIELD OF TECHNOLOGY

The examples described herein relate to actuators which may be used in a variety of applications such as in leading edge high lift architectures for aircraft wings.

BACKGROUND

High lift systems or devices are components or mechanisms that are positioned in or on an aircraft wing to increase the amount of lift that is produced by the wing in flight. In some systems the device may be a fixed component, however, in other systems the device may be a movable device that is employed when required. Examples of commonly known high lift devices include wing flaps and slats.

In known systems, wherein a plurality of movable leading edge surfaces are provided on a wing, the high lift system may comprise two rotary gear actuators (RGA) per surface, each RGA provided at an end of the movable surface.

SUMMARY

A new type of rotary geared actuator (RGA) is described herein for actuating movement of a first movable surface and a second movable surface. The RGA comprises: an input shaft configured to receive torque in use, and an output shaft comprising means configured to communicate with and move both said first surface and said second surface in use.

The means configured to communicate with and move both of said first movable surface and said second movable surface may comprises a spline.

In use, said spline may be configured to communicate with a first drive pinion of said first movable surface and further configured to communicate with a second drive pinion of said second surface.

The output shaft may be connected to the input shaft via a high ratio gear reduction within the RGA.

A high lift system for an aircraft wing is also described herein comprising the RGA described above, the RGA being defined as a first shared RGA that is positioned relative to said first and second movable surfaces, such that each of said first and second surfaces shares, and is actuated by, said first shared RGA.

The high lift system may further comprise a plurality of said shared RGAs positioned relative to a plurality of said movable surfaces, such that each of said plurality of movable surfaces shares, and is actuated by at least one of said shared RGAs.

In some examples the movable surfaces may be positioned in a row and adjacent to each other and said shared RGAs are positioned between said adjacent movable surfaces.

The high lift system may further comprise a non-shared RGA and a movable surface that is positioned at an end of the row of plurality of adjacent movable surfaces may be actuated at its first end by said non-shared RGA and at its second end by one of said shared RGAs.

A high lift system for an aircraft wing may also comprise the shared RGA as described herein that is shared by said first movable surface and said second movable surface.

The system may further comprise a first, non-shared RGA connectable to said first movable surface, the first movable surface being a surface of said aircraft wing, and said first shared RGA being connectable to both said first movable surface and said second movable surface, said second movable surface being a surface of said aircraft wing, and a second shared RGA connectable to said second movable surface; wherein said first non-shared RGA and said first shared RGA are configured to actuate said first movable surface; and wherein said first shared RGA and said second shared RGA are configured to actuate said second movable surface.

In some examples, the second shared RGA may be connectable to a third movable surface of said aircraft wing and the system may further comprise a third shared RGA connectable to said third movable surface of said aircraft wing and said second shared RGA and said third shared RGA may be configured to actuate said third movable surface.

In some examples, the third shared RGA may be connectable to a fourth movable surface of said aircraft wing and the system may further comprise a second non-shared RGA connectable to said fourth movable surface of said aircraft wing and said fourth RGA and said fifth RGA may be configured to actuate said fourth movable surface.

DETAILED DESCRIPTION

Figure 1:
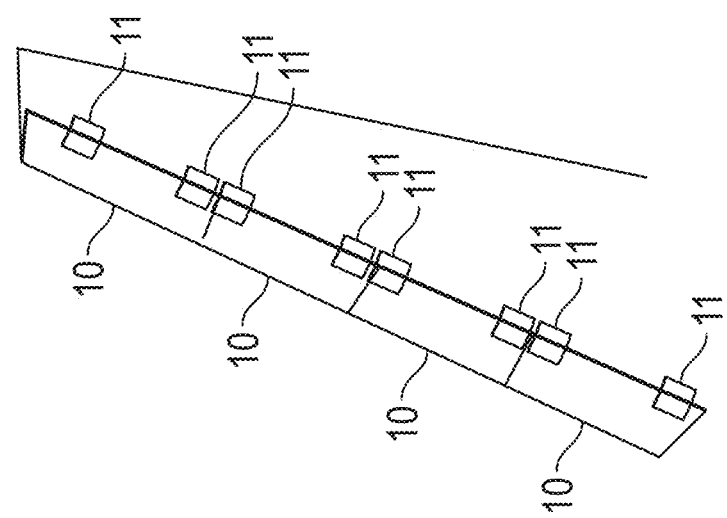
FIG. 1 shows an aircraft wing containing a known leading edge high lift system.

A known leading edge high lift system is shown in FIG. 1. As is shown in this figure, the system is configured to move four leading edge surfaces, 10, which in this case are Slats. The movable surfaces 10 are positioned along the leading edge of the wing and are positioned laterally adjacent to each other along the leading edge so that each extends away from the aircraft fuselage and in the direction of the outermost tip of the wing.

Each individual movable surface 10 is connected to, and actuated by, two separate and individual rotary gear actuators (RGAs) 11, with a first RGA 11 being provided at a first, end of the movable surface 10 and a second RGA 11 being provided at the opposite, second end of the movable surface 10. In use, when the high lift system is activated, each movable surface 10 is moved via actuation of the first and second RGAs 11 associated with that surface 10. Since each surface 10 utilises two RGAs 11, for an aircraft wherein four movable surfaces 10 are provided on a wing, sixteen RGAs are needed in total in order to actuate the movable surfaces 10 provided on the wings of the aircraft.

Figure 3:
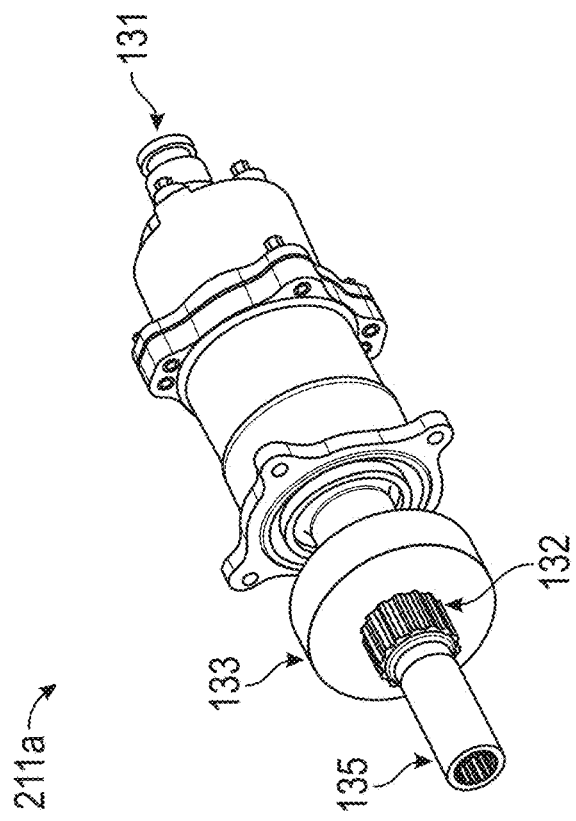
FIG. 3 depicts a conventional RGA such as that which may be used in conjunction with the example of FIG. 1, by which an output shaft communicates with a pinion or alternative connection to the moving surface.

FIG. 3 depicts a conventional RGA such as that which may be used in conjunction with the example of FIG. 1, by which an output shaft communicates with a pinion drive or alternative connection to the moving surface. The RGA shown in this figure may be used in a slat actuator arrangement for a conventional high lift architecture. As can be seen in the figure, the RGA comprises an input shaft 131 and an output shaft 132. Around the surface of the output shaft 132 there is provided a single surface drive pinion 133 which in use typically interacts with a rack that is connected directly to the surface.

The through shaft 135 is connected to the RGA input shaft 131 and communicates with transmission shafting that extends to the input shaft of the next RGA.

The new High Lift Systems 200 described herein aim to close the gap between cost and price of known High Lift Systems by providing an actuator that can be used in such a system to thereby simplify and provide a cost effective overall system. The new type of dual-use actuator described herein could also be used in other systems.

Figure 2:
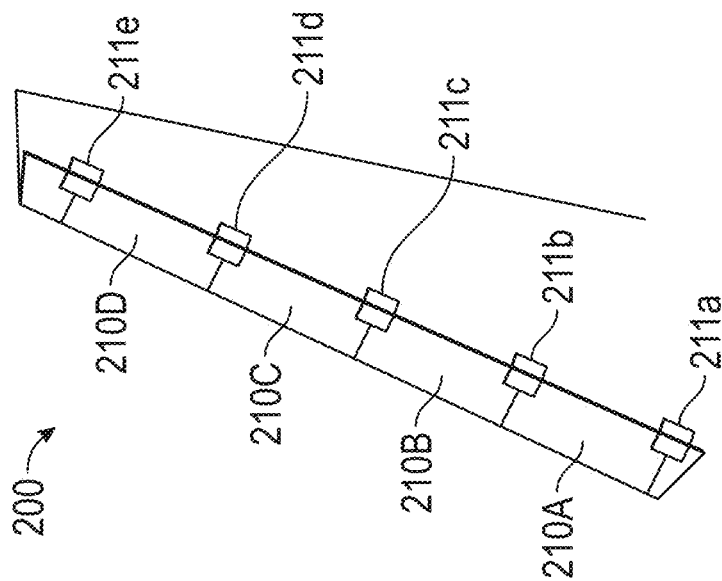
FIG. 2 shows a first example of a new type of leading edge high lift system present in an aircraft wing.

A new type of high lift system 200 is shown in FIG. 2. As can be seen in this figure, the wing may comprise a plurality of, (i.e. at least two) movable surfaces 210A-D. In the example shown in FIG. 2, four movable surfaces 210A-D are provided on each wing. In other examples a greater or lesser number of movable surfaces 210A-D may be provided on each wing and the system of this example 200 is not limited to only four. The plurality of movable surfaces 210A-210D are provided on the leading edge of the aircraft wing. As is known in the art, the leading edge of the aircraft wing extends outward from the main fuselage of the aircraft and ends at the wing tip. The movable surfaces 210A-D are therefore provided so as to be positioned along this leading edge so that they are consecutively adjacent to each other along the leading edge in the same way as shown in FIG. 1. This system could also be used with other movable surface configurations and is not limited to only this configuration. For example, the system could be used in a position that is not at the leading edge.

In this example, there is a first movable surface 210A which is positioned adjacent to a second movable surface 210B as shown in FIG. 2. A first, standard, or non-shared RGA 211a (such as that shown in FIG. 3) may be provided at a first end of the first movable surface 210a and a first new type, or shared RGA 211b (i.e. such as that shown in FIG. 4) is provided at the second, opposite end of the first movable surface 210a. This first shared RGA 211b is called herein a shared RGA because, in contrast to the example shown in FIG. 3, the first shared RGA 211b is also connectable/connected to the adjacent, or second movable surface 210B and is configured to be shared by both the first and second movable surfaces so that in use it not only actuates movement of the first movable surface 210A but also activates movement of the second movable surface 210B.

At the opposite, or second end of the second movable surface 210B, a second shared RGA 211c may also be provided. This second shared RGA 211c is configured not only to actuate and move the second movable surface 210B but is also connected to the adjacent third movable surface 210C and is further configured to activate the third movable surface 210C as well as the second movable surface 210B. This second shared RGA 211c is therefore shared by the second movable surface 210B and the third movable surface 210C.

The third movable surface 210C is also positioned adjacent to a fourth movable surface 210D and a third shared RGA 211d is positioned relative to the third 210C and fourth movable surfaces 210D such that the third shared RGA 211d is connected to both the third 210C and fourth 210D movable surfaces and is configured to actuate both of these movable surfaces 210C, 210D. This third shared RGA 211c is therefore shared by the third movable surface 210C and the fourth movable surface 210D.

Since the fourth movable surface 210D is the outermost movable surface, a second, conventional, or non-shared RGA 211e (e.g. similar to that shown in FIG. 3) may be provided at the second, most outermost end of the fourth movable surface 210D, which actuates only that fourth movable surface 210D as it is the last movable surface in the row.

In this example, since two adjacent movable surfaces are mutually actuated using the same, shared RGA, this high lift system only requires a total of five RGAs in order to actuate four movable surfaces. Therefore, for a single aircraft, which has eight movable surfaces, only ten RGAs are needed. This is greatly reduced in comparison to the known example of FIG. 1 wherein sixteen are required for the same number of movable surfaces.

Figure 4:
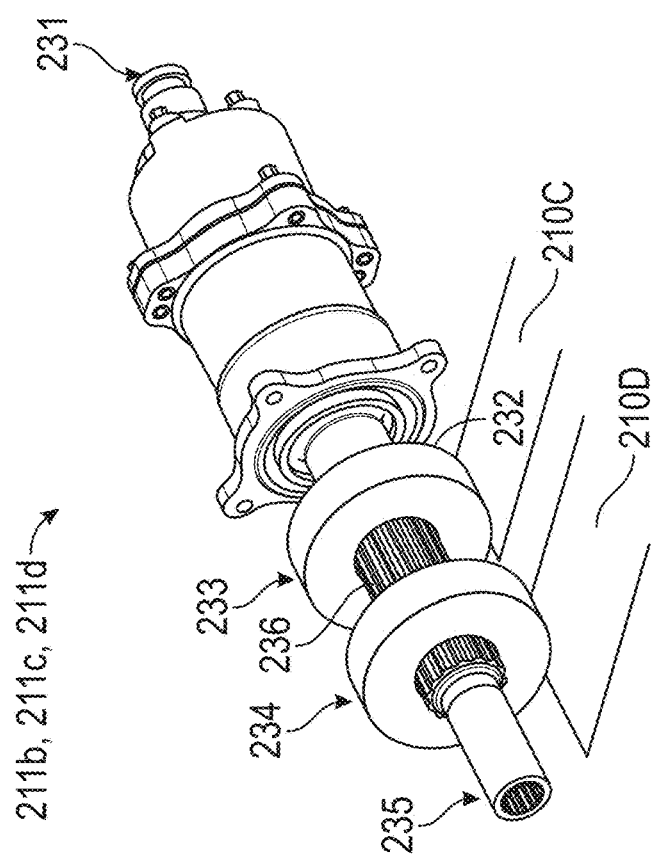
FIG. 4 depicts a new RGA such as that which may be used in conjunction with the example of FIG. 2, by which an output shaft communicates with two separate pinions or alternative connections to two moving surfaces.

FIG. 4 depicts the features of the shared RGAs as described above with reference to FIG. 2. This is described as being a slat actuator arrangement that may be used in high lift architectures such as that shown in FIG. 2. As can be seen in this figure, the RGA 211b, 211c, 211d comprises an input shaft 231 and an output shaft 232. The input shaft typically receives torque from a transmission shaft. The output shaft is connected to the input shaft via a high ratio gear reduction within the RGA.

The output shaft 232 of this shared RGA comprises means for connecting not just to one movable surface, but two movable surfaces. This is achieved due to the output shaft comprising a spline 236 or other suitable connection that mutually communicates with a first surface drive pinion 233 (which in use typically interacts with a rack that is connected directly to the first surface) and further comprises a second surface drive pinion 234 which in use typically interacts with a rack that is connected directly to the second surface. This can also be achieved in other ways, and the examples described herein are not limited to this.

In use, the though shaft 235 is connected to the RGA input shaft 231 and communicates with transmission shafting that extends to the input shaft of the next RGA.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A leading edge high lift system comprising:
   a first movable surface;
   a first surface drive pinion connected to the first movable surface;
   a second movable surface;
   a second surface drive pinion connected to the second movable surface;
   a rotary geared actuator (RGA) for actuating movement of the first movable surface and the second movable surface via the first surface drive pinion and the second surface drive pinion, respectively;
   the RGA comprising:
   an input shaft configured to receive torque in use; and
   an output shaft that includes a spline, wherein the spline contacts both the first surface drive pinion and the second surface drive pinion such that rotation of the output shaft moves both the first movable surface and the second movable surface;
   the leading edge lift system further comprising a second rotary geared actuator connected to the first movable surface at an opposite end of the first movable surface.

2. The leading edge high lift system of claim 1, wherein the output shaft is connected to the input shaft.

* * * * *